US011375555B2

(12) United States Patent
Garg et al.

(10) Patent No.: US 11,375,555 B2
(45) Date of Patent: Jun. 28, 2022

(54) MESH CONNECTIVITY ESTABLISHMENT

(71) Applicant: Parallel Wireless, Inc., Nashua, NH (US)

(72) Inventors: Sumit Garg, Hudson, NH (US); Gaurav Kumar, Nashua, NH (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 16/921,833

(22) Filed: Jul. 6, 2020

(65) Prior Publication Data

US 2021/0007155 A1 Jan. 7, 2021

Related U.S. Application Data

(60) Provisional application No. 62/870,310, filed on Jul. 3, 2019.

(51) Int. Cl.

| | |
|---|---|
| ***H04W 4/00*** | (2018.01) |
| ***H04W 76/10*** | (2018.01) |
| ***H04L 61/5007*** | (2022.01) |
| ***H04L 9/40*** | (2022.01) |
| ***H04W 12/069*** | (2021.01) |
| *H04W 88/16* | (2009.01) |
| *H04W 84/18* | (2009.01) |

(52) U.S. Cl.
CPC ......... *H04W 76/10* (2018.02); *H04L 61/2007* (2013.01); *H04L 63/166* (2013.01); *H04W 12/069* (2021.01); *H04W 84/18* (2013.01); *H04W 88/16* (2013.01)

(58) Field of Classification Search
CPC ...... H04W 84/18; H04W 8/005; H04W 84/12
See application file for complete search history.

(56) References Cited

U.S. PATENT DOCUMENTS

| | | | | |
|---|---|---|---|---|
| 2005/0102529 A1* | 5/2005 | Buddhikot | H04L 67/306 726/26 |
| 2013/0136033 A1* | 5/2013 | Patil | H04L 41/145 370/255 |
| 2016/0135107 A1 | 5/2016 | Hampel et al. | |
| 2018/0184470 A1* | 6/2018 | Luo | H04W 36/30 |

* cited by examiner

*Primary Examiner* — Omoniyi Obayanju
(74) *Attorney, Agent, or Firm* — Michael Y. Saji; David W. Rouille

(57) ABSTRACT

Methods and computer software are disclosed for establishing mesh connectivity. In one embodiment the method includes advertising, by a first Converged Wireless System (CWS) the presence of a mesh; detecting, by a second CWS, the presence of the mesh being advertised by a first CWS; performing, by the second CWS, secure certificate based authentication with the first CWS; and allocating, by the second CWS, an Internet Protocol (IP) address over the mesh and using the IP address as a logical address in an IP domain.

16 Claims, 7 Drawing Sheets

MESH CONNECTIVITY ESTABLISHMENT

CROSS-REFERENCE TO RELATED APPLICATIONS

This application claims priority under 35 U.S.C. § 119(e) to U.S. Provisional Pat. App. No. 62/870,310, filed Jul. 3, 2019, titled "Mesh Connectivity Establishment" which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03).

BACKGROUND

The present application relates to mesh connectivity, and methods of creating the same. Mesh networks have existed on the fringe of the IT world since the early 1980's. Typically, a wireless mesh network operates in a homogeneous fashion, meaning that the nodes within the network share certain traits enabling communication between them. An example of this could be a wireless mesh network operating on a Wi-Fi protocol.

SUMMARY

Methods and computer software are disclosed for establishing mesh connectivity. In one embodiment the method includes advertising, by a first Converged Wireless System (CWS) the presence of a mesh; detecting, by a second CWS, the presence of the mesh being advertised by a first CWS; performing, by the second CWS, secure certificate based authentication with the first CWS; and allocating, by the second CWS, an Internet Protocol (IP) address over the mesh and using the IP address as a logical address in an IP domain.

In another example embodiment, a non-transitory computer-readable medium contains instructions for establishing mesh connectivity The media includes instructions for advertising, by a first Converged Wireless System (CWS) the presence of a mesh; detecting, by a second CWS, the presence of the mesh being advertised by a first CWS; performing, by the second CWS, secure certificate based authentication with the first CWS; and allocating, by the second CWS, an Internet Protocol (IP) address over the mesh and using the IP address as a logical address in an IP domain.

DETAILED DESCRIPTION

Figure 1:
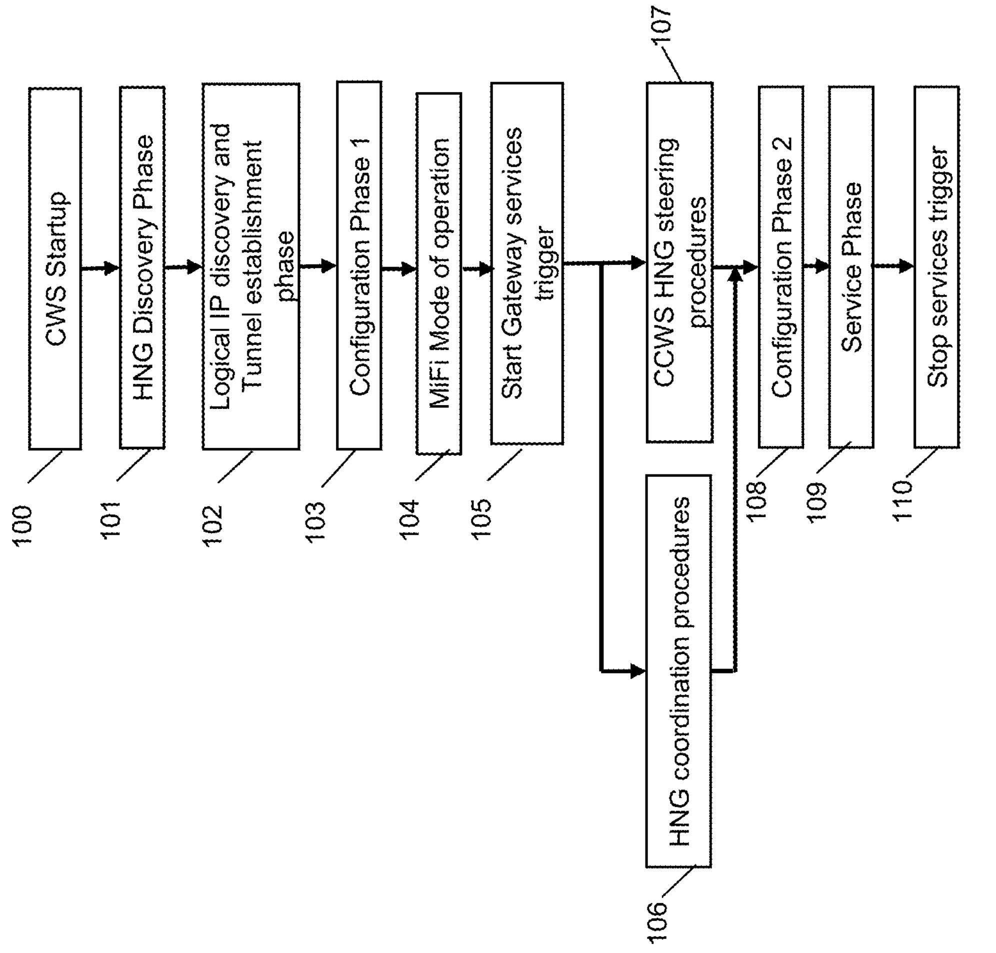
FIG. 1 is a flow diagram of an example embodiment of a method for providing mesh connectivity establishment, in accordance with some embodiments.

FIG. 1 shows an embodiment of a method for providing mesh establishment. Details of the various steps are provided later in the specification. The method includes processing block 100 for performing CWS startup. Processing block 101 shows the HNG discovery phase is executed and processing block 102 discloses the logical IP discovery and tunnel establishment phases are executed next.

Processing block 103 shows the start of the configuration phase 1. Processing block 104 shows a MiFi mode of operation. Processing block 105 shows starting the gateway services trigger.

Following processing block 105, processing continues with either processing block 106 or processing block 107. Processing block 106 shows executing HNG coordination procedures, while processing block 107 shows performing CWS HNG steering procedures. Processing continues with processing block 108 which shows performing configuration phase 2. Processing block 109 executes a service phase, and processing block 110 stops the services trigger.

FIG. 1 shows example mesh establishments that can happen in either of the following phases. One phase is referred to as CWS startup, also noted as processing block 100. In this phase, the 2nd CWS has no network connectivity until the point it comes in the vicinity of the 1st CWS. It's mesh radio will detect the presence of the mesh being advertised by the 1st CWS. It will do a secure certificate based authentication with the 1st CWS using a proprietary mechanism based off EAP-TLS. At this point an IP would be allocated over the mesh to be used at its logical address in the IP domain.

Figure 2:
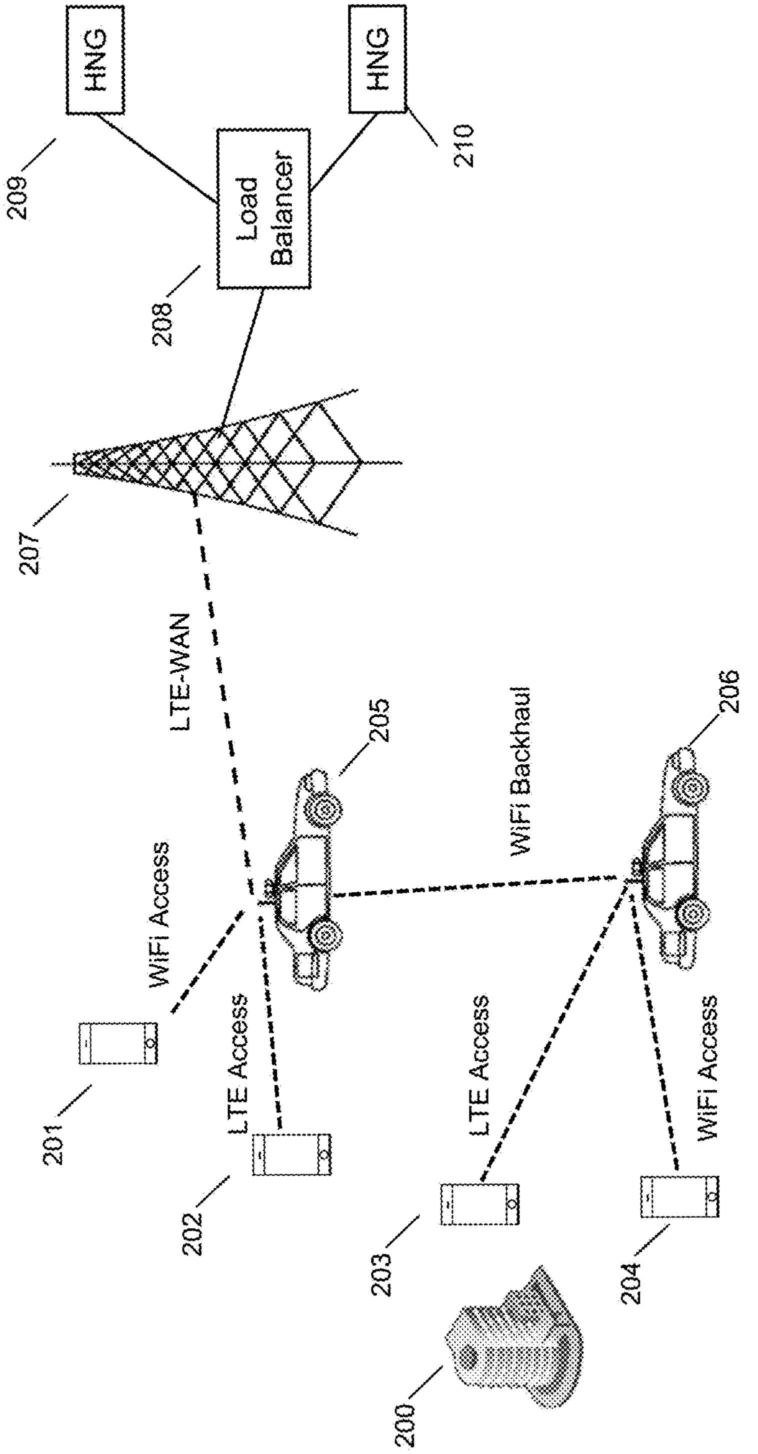
FIG. 2 is a first system diagram, in accordance with some embodiments.

This is shown in FIG. 2 wherein a building 200 is shown proximate four User Equipments (UEs), 201-204. Also shown are two vehicles 205 and 206. UE 201 is in communication with vehicle 205 using WiFi access. UE 202 is in communication with vehicle 205 using LTE access. UE 203 is in communication with vehicle 206 using LTE access. UE 204 is in communication with vehicle 206 using WiFi access. Vehicle 206 is in communication with vehicle 205 using WiFi backhaul. Vehicle 205 is in communication with base station 207 via LTE-WAN. Base station 207 is in communication with load balancer 208, which is in communication with HNG 209 and HNG 210. In this phase, the 2nd CWS has no network connectivity until the point it comes in the vicinity of the 1st CWS.

Figure 3:
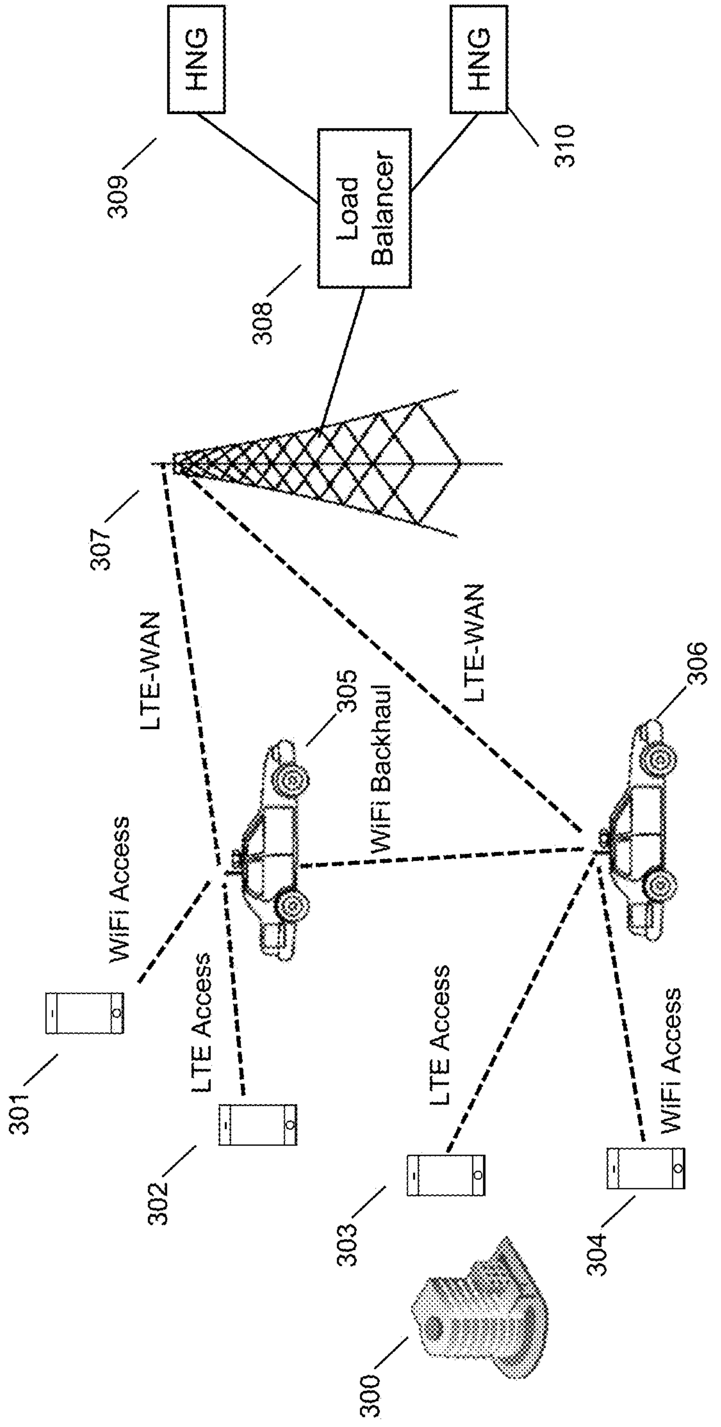
FIG. 3 is a second system diagram, in accordance with some embodiments.

FIG. 3 shows a building 300 is shown proximate four User Equipments (UEs), 301-304. Also shown are two vehicles 305 and 306. UE 301 is in communication with vehicle 305 using WiFi access. UE 302 is in communication with vehicle 305 using LTE access. UE 303 is in communication with vehicle 306 using LTE access. UE 304 is in communication with vehicle 306 using WiFi access. Vehicle 306 is in communication with vehicle 305 using WiFi backhaul. Vehicle 305 is in communication with base station 307 via LTE-WAN. Base station 307 is in communication with load balancer 308, which is in communication with HNG 309 and HNG 310. In contrast to FIG. 2, in this scenario, vehicle 306 is also in communication with base station 307 via an LTe-WAN.

In case the mesh services have not been launched they would be launched here. The following services go together with this step: Backhaul Bandwidth estimation and Traffic Shaping. This is required for RAC purposes.

In this scenario, both the CWSs are connected to either the same or different HNGs. In case the HNG is the same, routine procedures are followed, when the HNGs are different is when things get interesting.

Referring back to FIG. 1, processing block 107 is referred to as CWS HNG Steering Procedure. In this (optional) step we try to move the CWS to its logical owner in the current topology. The CWS tries to connect to/detect neighboring CWSs over the mesh. Once connected over the mesh: it learns about the logical HNG to host it over the meshing protocol; it moves its Ipsec connection to the new HNG. The new HNG generates/retrieves the configuration for this node. Stats collation is done at the EMS.

Advantages

The new CWS will always join the correct HNG.

Processing block 106 is the HNG Coordination Procedures. This is an alternative to above. Here the CWS stays with the HNG it was with. The CWS tries to connect to/detect neighboring CWSs over the mesh. Once connected over the mesh. It learns about the neighboring node's PCI, ANR Table, backhaul capacity over the mesh. The same is relayed to its serving HNG, which uses it as necessary for cell-startup procedures and could send a bandwidth reservation request (using the CWS or directly) to the other HNG.

Advantages

Mesh Benefits

Network Range Extension. In CWSStartup scenario, the mesh is used to extend the range of the LTE macro.

Virtual Network Sniffing. For a CWS already providing service, the mesh can be used to broadcast its 4G network specific information like PCI, power-level, GPS-location and ANR table. This can be done in two different ways. One way is in the WiFi Beacon Frame. It allows us send data in a vendor specific attribute. We send the relevant information in there.

Advantages

Faster as the mesh does not need to connect (No wait for DFS either at connect time). Slightly higher range for Beacon Frames. As data is captured in the scan cycle we capture data from all neighboring nodes even if on different Wi-Fi network.

In the Meshing Protocol

Advantages

As the protocol can implement transactions, the overhead is minimal.

Traffic Type Based Priority/Slicing

All IP traffic in the mesh is marked with the traffic type (VoLTE, IMS signaling etc.). It allows to give priority to ESN traffic from a mesh node over the non-ESN/data traffic from the Gateway-node even if the non-critical traffic has similar or higher DSCP/TOS value.

Traffic Type Based Routing (Planned)

All IP traffic in our mesh is marked with the traffic type (VoLTE, IMS signaling etc.). It allows to steer/route mesh traffic based on the type and move non-critical traffic to a route with higher latency.

Bandwidth Negotiation (Planned)

If a multiplicity of LTE backhauls is available, the mesh would allow us to borrow/reserve some bandwidth at various donor nodes; so that in congestion/low bandwidth scenarios a node can send/distribute its high priority traffic over multiple backhauls.

Figure 4:
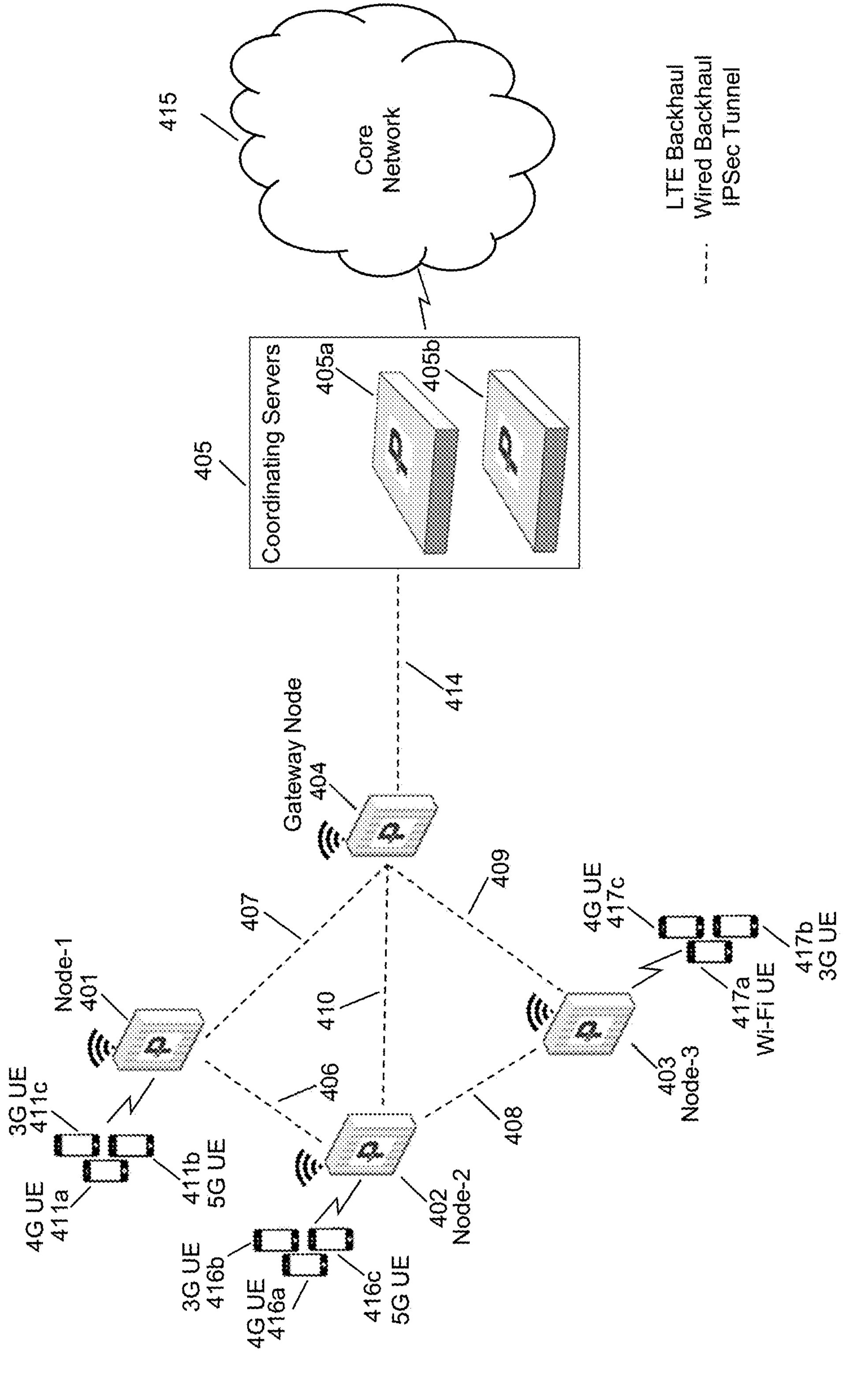
FIG. 4 is a system diagram including a mesh network, in accordance with some embodiments.

A network diagram including a mesh network in accordance with some embodiments is shown in FIG. 4. In some embodiments a mesh node 1 401, a mesh node 2 402, and a mesh node 3 403 are any G RAN nodes. Base stations 401, 402, and 403 form a mesh network establishing mesh network links 406, 407, 408, 409, and 410 with a base station 404. The mesh network links are flexible and are used by the mesh nodes to route traffic around congestion within the mesh network as needed. The base station 404 acts as gateway node or mesh gateway node, and provides backhaul connectivity to a core network to the base stations 401, 402, and 403 over backhaul link 414 to a coordinating server(s) 405 and towards core network 415. The Base stations 401, 402, 403, 404 may also provide eNodeB, NodeB, Wi-Fi Access Point, Femto Base Station etc. functionality, and may support radio access technologies such as 2G, 3G, 4G, 5G, Wi-Fi etc. The base stations 401, 402, 403 may also be known as mesh network nodes 401, 402, 403.

The coordinating servers 405 are shown as two coordinating servers 405*a* and 405*b*. The coordinating servers 405*a* and 405*b* may be in load-sharing mode or may be in active-standby mode for high availability. The coordinating servers 405 may be located between a radio access network (RAN) and the core network and may appear as core network to the base stations in a radio access network (RAN) and a single eNodeB to the core network, i.e., may provide virtualization of the base stations towards the core network. As shown in FIG. 4, various user equipments 411*a*, 411*b*, 411*c* are connected to the base station 401. The base station 401 provides backhaul connectivity to the user equipments 411*a*, 411*b*, and 411*c* connected to it over mesh network links 406, 407, 408, 409, 410 and 414. The user equipments may be mobile devices, mobile phones, personal digital assistant (PDA), tablet, laptop etc. The base station 402 provides backhaul connection to user equipments 412*a*, 412*b*, 412*c* and the base station 403 provides backhaul connection to user equipments 413*a*, 413*b*, and 413*c*. The user equipments 411*a*, 411*b*, 411*c*, 412*a*, 412*b*, 412*c*, 413*a*, 413*b*, 413*c* may support any radio access technology such as 2G, 3G, 4G, 5G, Wi-Fi, WiMAX, LTE, LTE-Advanced etc.

supported by the mesh network base stations, and may interwork these technologies to IP.

In some embodiments, depending on the user activity occurring at the user equipments 411*a*, 411*b*, 411*c*, 412*a*, 412*b*, 412*c*, 413*a*, 413*b*, and 413*c*, the uplink 414 may get congested under certain circumstances. As described above, to continue the radio access network running and providing services to the user equipments, the solution requires prioritizing or classifying the traffic based at the base stations 401, 402, 403. The traffic from the base stations 401, 402, and 403 to the core network 415 through the coordinating server 405 flows through an IPSec tunnel terminated at the coordinating server 405. The mesh network nodes 401, 402, and 403 adds IP Option header field to the outermost IP Header (i.e., not to the pre-encapsulated packets). The traffic may from the base station 401 may follow any of the mesh network link path such as 407, 406-110, 406-108-109 to reach to the mesh gateway node 404, according to a mesh network routing protocol.

Figure 5:
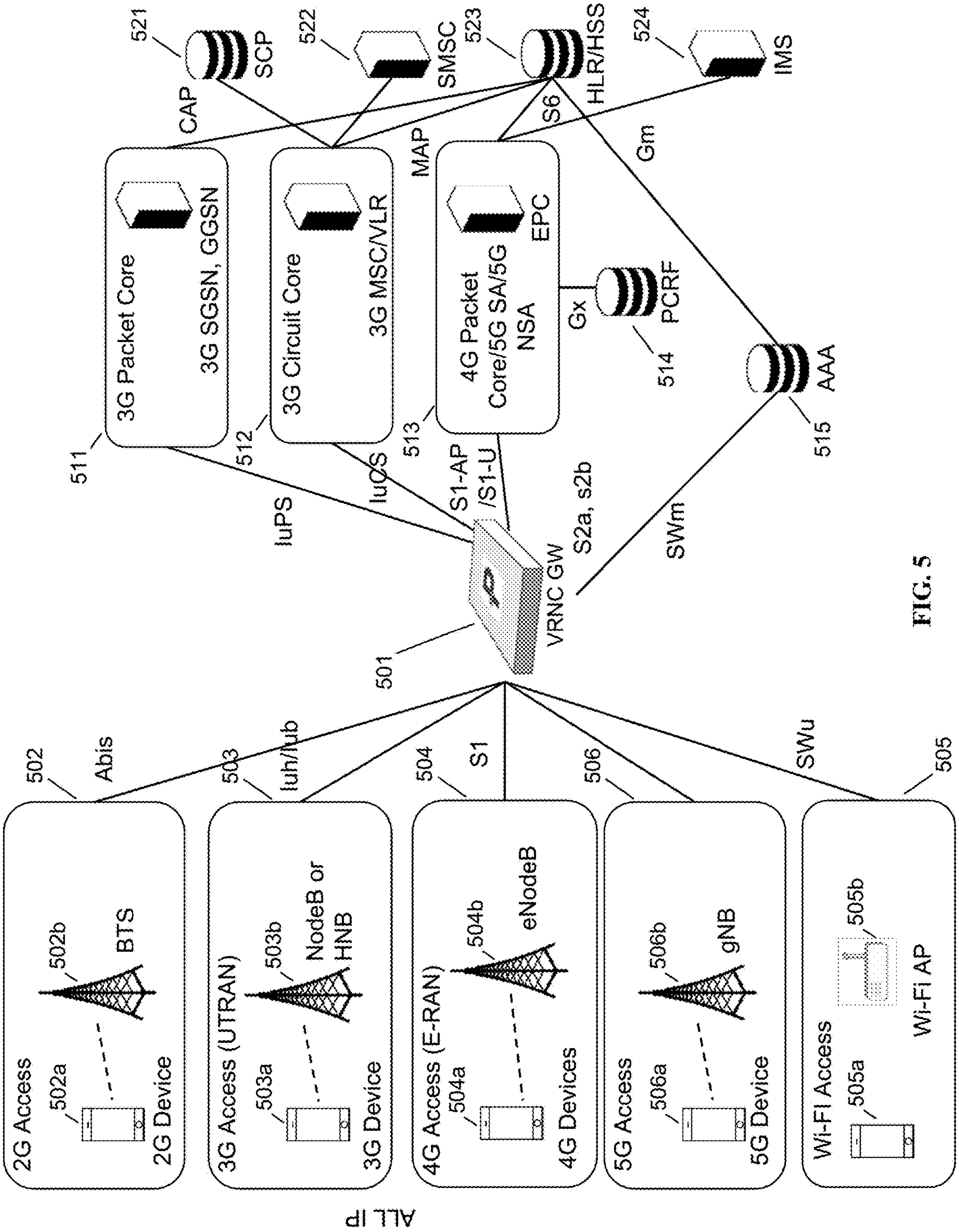
FIG. 5 is a system diagram for 3G and other-G networks in accordance with some embodiments.

Shown in FIG. 5 is a schematic network architecture diagram for 3G and other-G prior art networks. The diagram shows a plurality of "Gs," including 2G, 3G, 4G, 5G and Wi-Fi. 2G is represented by GERAN 501, which includes a 2G device 501*a*, BTS 501*b*, and BSC 501*c*. 3G is represented by UTRAN 502, which includes a 3G UE 502*a*, nodeB 502*b*, RNC 502*c*, and femto gateway (FGW, which in 3GPP namespace is also known as a Home nodeB Gateway or HNBGW) 502*d*. 4G is represented by EUTRAN or E-RAN 503, which includes an LTE UE 503*a* and LTE eNodeB 503*b*. Wi-Fi is represented by Wi-Fi access network 504, which includes a trusted Wi-Fi access point 504*c* and an untrusted Wi-Fi access point 504*d*. The Wi-Fi devices 504*a* and 504*b* may access either AP 504*c* or 504*d*. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501*c* is required for Abis compatibility with BTS 501*b*, while for the 3G UTRAN, an RNC 502*c* is required for Iub compatibility and an FGW 502*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 6:
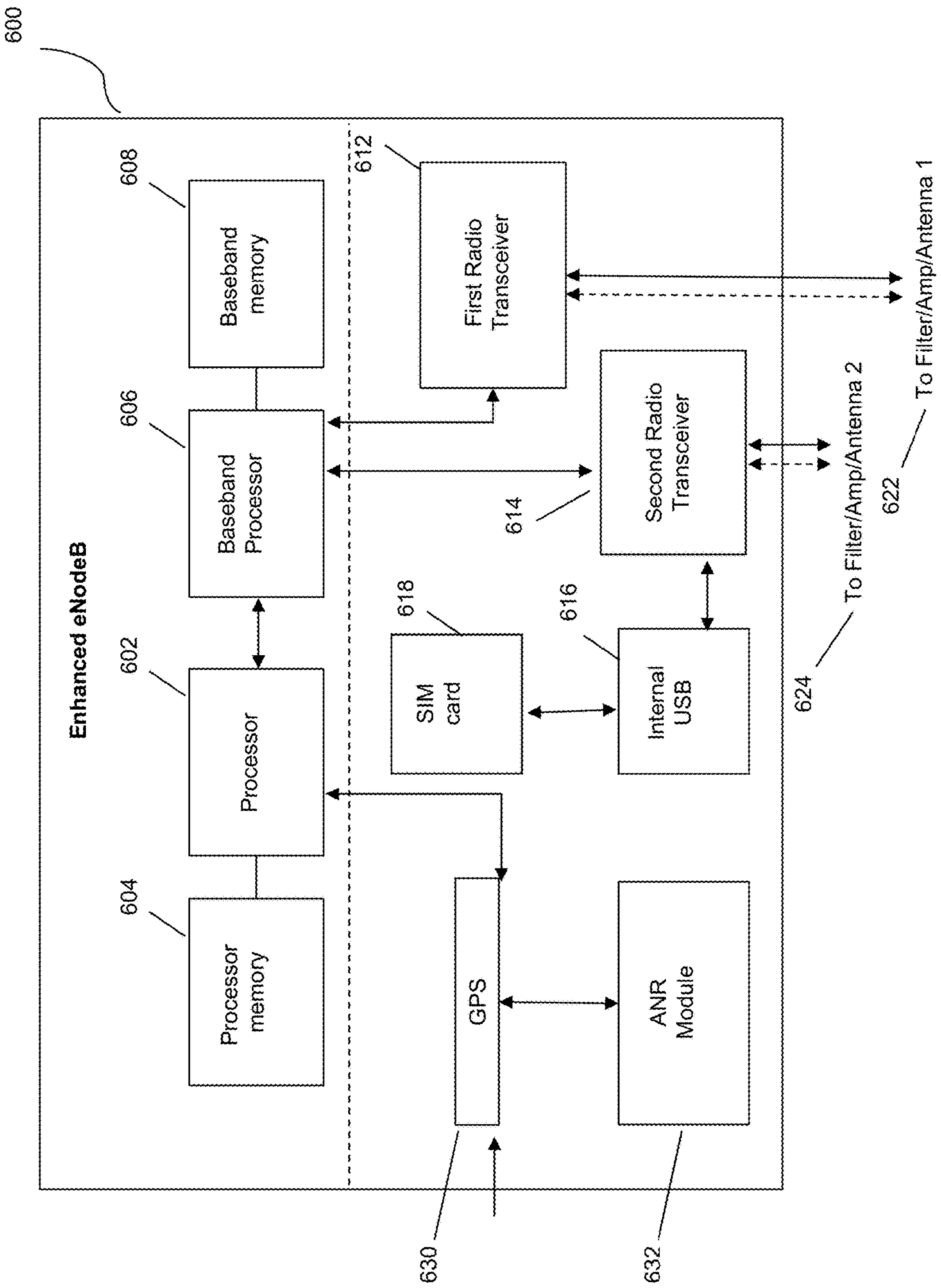
FIG. 6 is a diagram for an enhanced eNodeB, in accordance with some embodiments.

Shown in FIG. 6 is an enhanced eNodeB for performing the methods described herein, in accordance with some embodiments. Mesh network node 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
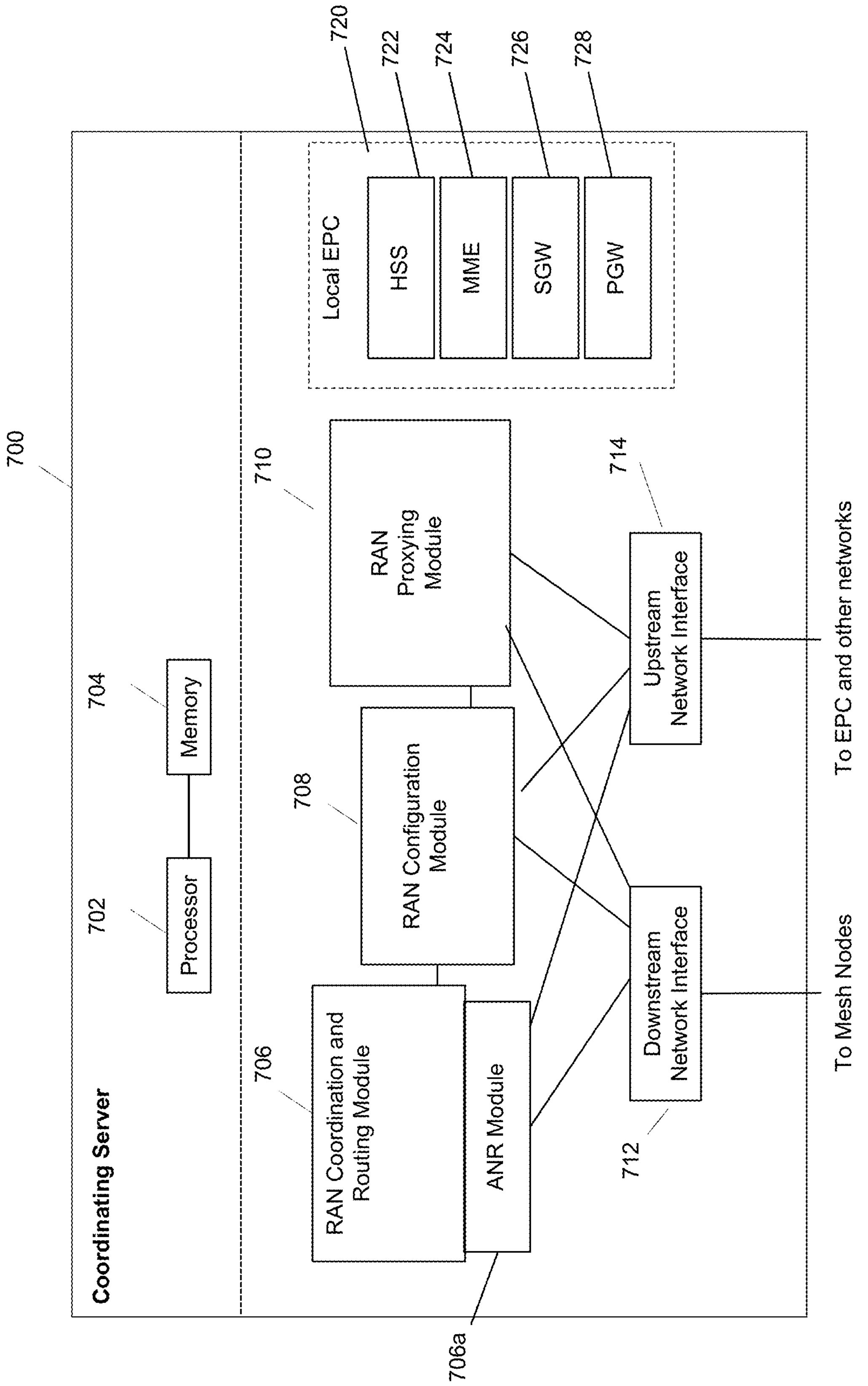
FIG. 7 is a diagram for a coordinating server, in accordance with some embodiments.

Shown in FIG. 7 is a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706*a*, RAN configuration module 708, and RAN proxying module 710. The ANR module 706*a* may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

Coordinator 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device.

Although the above systems and methods for providing mesh connectivity establishment are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

In some embodiments, a single HNG may be spread out over multiple servers, or even physical locations, and tied together using virtual memory and/or network connections, but this shall still be understood to be "co-located" for purposes of the present disclosure.

Wherever 3G and 4G radio access technologies (RATs) are discussed herein, it is understood that the present disclosure could be adapted to combinations of other RATs as well, for example, 3G and 5G, 4G and 5G, 4G and Wi-Fi, etc. For example, 5G introduces a new state, INACTIVE, as well as IDLE and CONNECTED, which are known in LTE, a new state, Rel-13 Suspend, that is used in LTE as well, and also two new messages, Suspend and Resume, that go along with these new states. When the UE is in the inactive or suspend states, it is able to move around within a limited area without updating the core network. In some embodiments, where a 4G and 5G core are colocated and the UE has moved from a 4G RAT to a 5G RAT (or vice versa), instead of signaling caused by the UE moving to CONNECTED state being performed between the 5G core and 4G core, the signaling can be absorbed between the core networks and the new serving node RAT can send a message to the UE indicating that all core network signaling is complete, without sending and receiving ISR messages between the cores.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for establishing mesh connectivity at a base station, the method comprising:

advertising, by a first base station, the presence of a mesh;

detecting, by a second base station, the presence of the mesh being advertised by the first base station;

performing, by the second base station, secure certificate based authentication with the first base station;

allocating, by the second base station, an Internet Protocol (IP) address over the mesh and using the IP address as a logical address in an IP domain; and moving, by the first base station, an Internet Protocol Security (IPSec) connection to a coordinating server, and the coordinating server retrieving or generating a configuration for the second base station.

2. The method of claim 1, wherein the secure certificate based authentication is performed using a mechanism based on Extensible Authentication Protocol-Transport Layer Security (EAP-TLS).

3. The method of claim 1, further comprising starting a gateway services trigger by performing backhaul bandwidth estimation and traffic shaping.

4. The method of claim 3 further comprising performing Heterogeneous Network (HNG) steering.

5. The method of claim 4, further comprising connecting the first base station to the second base station over the mesh.

6. The method of claim 5, further comprising the first base station learning a second coordinating server to host the second base station over the meshing protocol.

7. The method of claim 1, further comprising the first base station learning about a neighboring node's ANR table and backhaul capacity over the mesh.

8. The method of claim 7, further comprising relaying the neighboring node's ANR Table and backhaul capacity to a serving coordinating server.

9. A non-transitory computer-readable medium containing instructions for establishing mesh connectivity, comprising:

advertising, by a first base station, the presence of a mesh;

detecting, by a second base station, the presence of the mesh being advertised by the first base station;

performing, by the second base station, secure certificate-based authentication with the first base station;

allocating, by the second base station, an Internet Protocol (IP) address over the mesh and using the IP address as a logical address in an IP domain; and moving, by the first base station, an Internet Protocol Security (IPSec) connection to a coordinating server, and the coordinating server retrieving or generating a configuration for the second base station.

10. The computer-readable medium of claim 9, further comprising instructions wherein the secure certificate-based authentication is performed using a proprietary mechanism based off Extensible Authentication Protocol-Transport Layer Security (EAP-TLS).

11. The computer-readable medium of claim 9 further comprising instructions for starting a gateway services trigger by performing backhaul bandwidth estimation and traffic shaping.

12. The computer-readable medium of claim 11, further comprising instructions for performing Heterogeneous Network Gateway (HNG) steering.

13. The computer-readable medium of claim 12, further comprising instructions for connecting the first base station to the second base station over the mesh.

14. The computer-readable medium of claim 13, further comprising instructions for the first base station learning a second coordinating server to host the second base station over the meshing protocol.

15. The computer-readable medium of claim 9, further comprising instructions for the first base station learning about one or more of a neighboring node's ANR table and backhaul capacity over the mesh.

16. The computer-readable medium of claim 15, further comprising instructions for relaying the neighboring node's ANR table and backhaul capacity to a serving coordinating server.

* * * * *